Sept. 6, 1938.  F. J. LEWANDO  2,129,064
SHAVING IMPLEMENT
Filed May 7, 1937
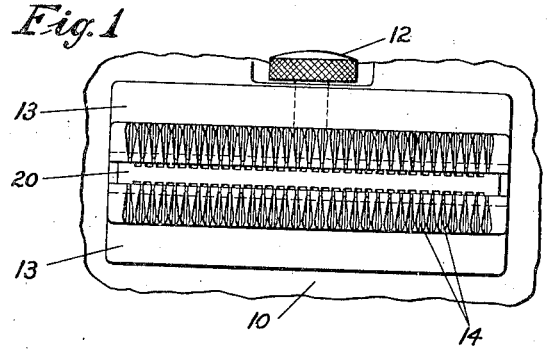
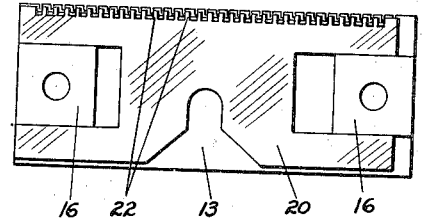
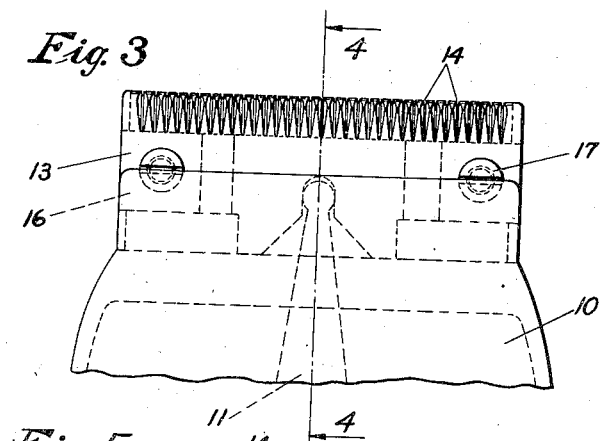
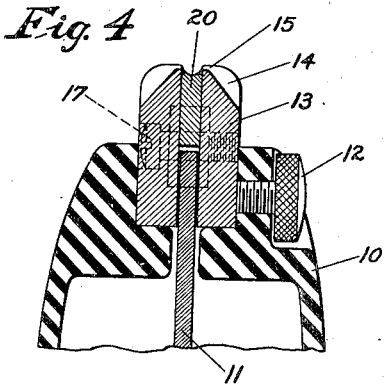
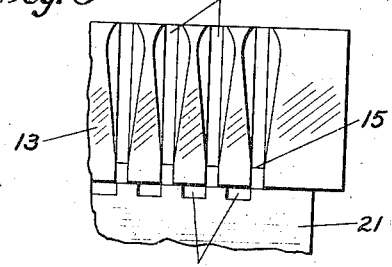
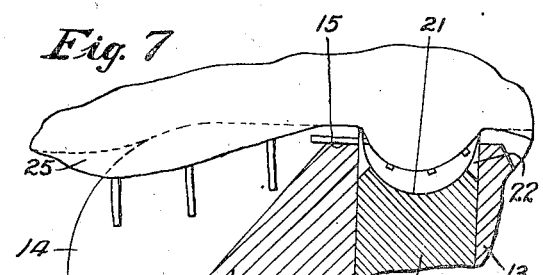
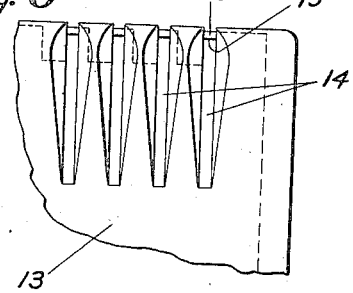
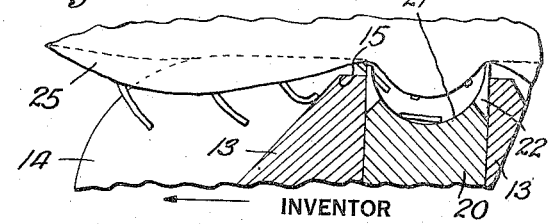
INVENTOR
BY Felix J. Lewando
ATTORNEY Patented Sept. 6, 1938

2,129,064

UNITED STATES PATENT OFFICE 2,129,064

SHAVING IMPLEMENT

Felix J. Lewando, South Boston, Mass., assignor to Gillette Safety Razor Company, Boston, Mass., a corporation of Delaware Application May 7, 1937, Serial No. 141,317

15 Claims. (Cl. 30—43)

This invention relates to dry shaving implements of the type employing co-operating shearing members. In such implements as heretofore constructed the shearing edges have been disposed substantially parallel to the surface to be shaved and have accordingly necessitated the interposition of guard teeth or shearing teeth between the plane or zone of shearing and the surface to be sheared. This results in gauging the stubble left on the face to an appreciable length depending upon the thickness of the interposed teeth. In some instances the thickness of these teeth has been reduced to an extent which has rendered them no longer rigid and which results in impairing the life and accurate shearing operation of the implement, but even in these cases it has been thought impracticable to dispense with guard teeth four or five thousandths of an inch in thickness so that the resulting stubble must have at least this minimum length.

I have discovered that a most efficient, convenient and comfortable dry shaving implement may be constructed on an entirely new principle, viz., instead of arranging the shearing edges substantially parallel to the surface to be shaved, they may be disposed substantially normal or at right angles to that surface. In one aspect, accordingly, my invention comprises a dry shaving implement having co-operating shearing members contacting in a common plane which is substantially normal to its skin-engaging face and consequently also normal or disposed substantially at right angles to the surface to be shaved and having respectively recesses extending in opposite direction from said plane to form shearing teeth. In this way are provided shearing edges which extend normal or end-on to the surface to be shaved and there are no guard teeth interposed between the shearing plane and the surface to be shaved. In other words, the recesses extend in the same general direction as the hairs which are to be severed and the edges formed by the recesses extend without obstruction to the face to be shaved.

It remains now to deflect across the shearing plane the individual hairs which have entered the recesses or passages of the implement. This is accomplished as herein shown by providing a series of passages arranged naturally to receive hairs as the implement is moved over the face and to conduct them to the shearing plane, the said passages being so shaped as to deflect the hairs progressively until they are bent over, close to the root, across the shearing plane. One way of effecting the desired results is by inclining the bottom of each hair passage upwardly and inwardly so that it gradually decreases in depth and will engage and deflect each individual hair when the implement is moved to predetermined position with respect to it. As herein shown the inclined bottom of each groove is provided with an abrupt shoulder adjacent to its inner or shearing end and at a slight distance below its end face so that even a short hair is engaged and sharply deflected as it is carried through the passage in the movement of the implement.

Preferably and as herein shown the upper face of one member, preferably the movable shearing member, is concave in contour so that the skin of the user may bulge or be deflected adjacent to the shearing plane and thus is facilitated the deflection of the individual hairs into sharply inclined position as compared to that at which they normally stand. The invention as herein shown is embodied in an implement having spaced outer shearing members which are stationary and a single intermediate shearing member which is reciprocated between them. It would be within the scope of the invention, however, to employ only a single stationary shearing member if desired.

These and other features of the invention will be best understood and appreciated from the following description of a preferred embodiment thereof, selected for purposes of illustration and shown in the accompanying drawing, in which:—

Fig. 1 is an end or plan view of the implement on an enlarged scale, portions of the casing being shown as broken away;

Fig. 2 is a view in elevation of the cutting head with one of the side members removed;

Fig. 3 is a similar view of the implement in side elevation;

Fig. 4 is a sectional view on the line 4—4 of Fig. 3;

Fig. 5 is a fragmentary end view on a still larger scale;

Fig. 6 is a fragmentary view in elevation on the same enlarged scale;

Fig. 7 is a diagrammatic sectional view on a still larger scale illustrating the behavior of hairs passing to the shearing plane or zone; and Fig. 8 is a similar view showing the action of the implement on hairs growing in an inclined position.

The implement includes in its organization an elongated casing 10 of moulded material, such as "Bakelite", shaped to serve as a handle and also as a housing for a small motor and actuating mechanism by which the implement is operated.

The casing 10 is formed at its upper end with spaced flanges to receive the metallic head of the implement, one of these flanges being threaded to receive a clamping screw 12. The head of the implement includes a pair of similar side members 13 of high grade steel, rectangular in shape and rigidly secured together in spaced relation by means of square spacing blocks 16 and transverse screws 17. The screws 17 are countersunk into one of the members and threaded into the other as best shown in Fig. 4.

Each of the side members is provided in its upper and outer faces with a series of deep parallel grooves 14 forming long narrow transverse hair passages. The walls of the grooves 14 flare both outwardly and upwardly to facilitate the entrance of hairs as the implement is moved over the face of the user and the grooves are separated by flat areas of greater width than the grooves. The bottom of each groove 14 is inclined upwardly and inwardly at approximately an angle of 45° to the plane of the end face of the implement. This slope is terminated at the shoulder 15 where the passage turns abruptly inwardly below the plane of the upper face of the member 13. At its outer end each slot 14 is considerably deeper than the length of any hair which it is likely to encounter in use, but at its inner end the horizontal passage is not more than eight or nine thousandths of an inch below the plane of the end of the implement. The slotted end faces of the side members 13 are of appreciable area and together constitute the skin-engaging face of the implement. In use this face should bear evenly upon the surface to be shaved and so it determines the proper shaving position of the implement for best results.

Between the two spaced side members 13 is arranged a reciprocatory shear member shaped to co-operate with both of them. The shear member comprises a flat hardened plate or bar 20 having rectangular end slots for the reception of the two spacing blocks 16 which also act as guides for the shear member. The side faces of the shear plate 20 may be slightly relieved to reduce friction, if desired, but the plate is positively guided for longitudinal reciprocation upon the blocks 16 and derives its movement from the oscillation of a lever 11 which is operated by the motor in the handle of the implement. The shear plate is notched in its lower edge for the reciprocation of the upper end of the lever 11. The shear plate 20 is provided with an upper edge face 21 which is sharply concave. This concave face intersects the side walls of the plate 20 on lines lightly below the upper and inner corner edges of the side members 13, as shown in Fig. 7. The shear plate 20 is provided with a series of grooves 22 in its outer faces forming spaced shear teeth. The grooves 22 extend downwardly and inwardly to the concave face 21 of the cutter terminating in outwardly sloping bottom edges below the level of the shoulders 15. Shearing teeth are thus formed which project upwardly and open through the upper concave face of the shear plate 20 along both of its edges. The shearing teeth in the plate or bar 20 may extend substantially to the skin-engaging face of the implement, preferably terminating two or three thousandths of an inch below that face to obviate danger of scratching. The grooves 22 in the illustrated shearing plate are disposed with the same spacing as that of the hair passages 14 of the side members. It will thus be seen that the co-operating shearing edges of the two members lie in their vertical planes of contact and that the implement has no shearing edges which are disposed parallel to the surface to be shaved and no interposed guard member which has the effect of limiting the closeness of the shave and gauging the length of the stubble. As will be apparent from Fig. 7 the co-operating members 13 and 20 have common vertical planes of contact and recesses opening oppositely therein and spaced to provide the shearing edges. Moreover, the common planes of contact are disposed substantially normal to the surface to be shaved, although as will be presently explained, the concave surface of the cutter 20 permits the skin of the face to be locally deflected or to bulge somewhat in the shaving operation.

The shaving action of the implement is graphically represented in Fig. 7 and Fig. 8 in which a series of hairs are shown as projecting downwardly from a surface 25 to be shaved. Assuming that the implement is moved toward the left, as indicated by the arrow, the hairs will enter one or more of the grooves 14, entrance being facilitated by the flaring character of the walls of these grooves. As the implement is moved toward the left the hairs, one after another, engage the upwardly inclined bottom of the groove and are deflected in one direction or the other depending on their direction of growth, more and more until the shoulder 15 is reached. At this point each hair lies in almost horizontal position and in the continued movement of the implement the root end portion of the deflected hair is carried across the plane of contact between the left-hand side member 13 and the shear plate 20. This is facilitated by the bulging of the skin into the space afforded by the concave upper surface of the shear plate and into the grooves 14. As soon as this condition has been created the reciprocation of the shear plate 20 severs the hair very close to the skin 25. When the hair has been severed the short remaining stubble immediately springs out of the slot in the cutter member and is released thereby so that there is no tendency to pull. In other words, the hairs are engaged one by one in upright position, then deflected and immediately sheared when any portion of them is carried across the common plane of contact between the two co-operating shear members. The result is a very effective and efficient shaving operation which is effected smoothly and without any discomfort to the user.

Having thus disclosed my invention and described one preferred embodiment thereof for purposes of illustration but not by way of limitation, I claim as new and desire to secure by Letters Patent:—

1. A dry shaving implement including a stationary member provided with an end guard face of extended flat area and adapted to be moved over the surface to be shaved and slotted to provide hair passages separated by shearing teeth, said member having a plane inner shearing face disposed at right angles to said guard face, a co-operating shearing member having a plane shearing face movable in contact with the face of said stationary member and recessed to provide shearing teeth of substantial length therein, said shearing teeth making face-to-face contact and said hair passages being shaped to compel hairs to bend as they arrive in the shearing plane.

2. A dry shaving implement including a stationary member having a flat extended skin-engaging face with transverse hair passages therein and a shearing face disposed at right angles to said skin-engaging face, in combination with a reciprocatory member mounted to slide in contact with said face and recessed in its end face thus providing shearing teeth adapted to operate normal to the surface being shaved, said hair passages being shaped to compel hairs to bend in reaching the shearing plane.

3. A dry shaving implement having a transverse guard face grooved to present hair passages of inwardly decreasing depth and a contact face disposed at right angles thereto, and a reciprocatory member having a corresponding contact face provided with spaced shearing teeth and a concave outer face.

4. A dry shaving implement having a stationary shear member with a horizontal skin-engaging face and an inner vertical shearing face, said member having transverse hair passages with upwardly and inwardly inclined bottoms whereby hairs entering the passages in upright condition are bent over when they reach the inner ends of said passages, and a reciprocatory member having shearing edges which are moved past the inner ends of said hair passages.

5. A dry shaving implement having an intermediate reciprocating member with a concave outer face and side walls notched to present shearing edges, and outer stationary members each having a flat transversely slotted skin-engaging face acting as a guard for the implement and said faces being disposed in a common plane, said transverse slots in the outer stationary members forming long narrow hair-passages opening through the inner walls of said members, separated by flat areas wider than the passages and providing co-operating shearing edges disposed in planes normal to said skin-engaging faces.

6. A dry shaving implement having an outer shear member with a series of deep grooves in its upper and outer faces, the bottom wall of each groove being inclined upwardly and inwardly and including a shoulder near its inner end, said grooves opening through the inner wall of said member to form spaced shearing teeth, and a reciprocatory member having shearing teeth co-operating therewith.

7. A dry shaving device having co-operating shearing members relatively movable, presenting a skin-engaging face of appreciable area and having a common shearing plane of contact disposed substantially normal to said skin-engaging face, the respective members having recesses extending in opposite directions from said common plane, and means for deflecting hairs from their normal position so that they cross said plane.

8. A dry shaving device having co-operating shearing members presenting a skin-engaging face of appreciable area and having a common shearing plane of contact which is disposed substantially at right angles to said skin-engaging face and with oppositely extending recesses providing shearing edges in said plane adapted to operate normal to the surface being shaved, and means for deflecting hairs across said plane, one of said members having a concave face to facilitate bulging of the skin adjacent to the shearing plane.

9. A dry shaving implement having stationary outer shear members collectively presenting a skin-engaging face of appreciable area with parallel transverse slots therein which are separated by flat areas of greater width than the slots, said outer members being arranged with a reciprocatory shear member between them and having common planes of contact therewith disposed substantially normal to said skin-engaging face, said slots providing shearing edges in the outer members and said reciprocatory member having oppositely opening recesses forming shearing edges adapted to operate in a plane substantially normal to the surface being shaved, and said inner member presenting a concaved face.

10. A dry shaving implement having stationary guard members presenting a flat skin-engaging face of substantial area provided with parallel transverse grooves forming hair passages separated by flat areas of greater width than the grooves, and an intermediate shearing member having a curved and substantially smooth surface for contact with the user's face and notches in its side wall forming shearing teeth adapted to operate in a plane disposed substantially normal to said skin-engaging face.

11. A dry shaving device having a stationary shear member with a flat end face of substantial area having a series of long narrow hair passages therein separated by flat areas wider than the passages and forming a series of shearing edges in one of its walls which defines a shearing plane disposed substantially at right angles to said skin-engaging face, and a reciprocatory shear member sliding in contact with said notched wall and having slots forming co-operating shearing teeth in its contact wall and a concaved end face permitting bulging of the skin adjacent to the line of the shearing plane.

12. A dry shaving implement having cooperating shearing members, one presenting a flat extended skin-engaging face of substantial area traversed by long narrow hair passages which are narrower than the flat areas between them and which provide shearing edges in said member, said members contacting in a common plane normal to said face and the other of said members having recesses extending in an opposite direction from said plane of contact, thereby forming shearing teeth adapted to operate normal to said skin-engaging face and which extend into close proximity thereto.

13. A dry shaving implement including cooperating members, one presenting a skin-engaging face occupying an appreciable area in a single plane and traversed by long narrow hair passages which are narrower than the area of face between them and which provide shearing edges in said member, said members meeting in a common plane which is substantially normal to said skin-engaging face and the other of said members having end openings providing teeth with cooperating shearing edges adapted to operate normal to the surface being shaved and both shearing edges extending into close proximity to the plane of said skin-engaging face.

14. A dry shaving implement having stationary outer shear members collectively presenting a skin-engaging face of appreciable area traversed by long narrow hair passages which are narrower than the area of face between them, a reciprocatory shear member arranged for movement between said outer members and having common planes of contact therewith which are disposed substantially normal to said skin-engaging face, said hair passages providing shearing edges in the outer members and said reciprocatory member having recesses opening on the common planes of contact and forming shearing edges adapted to operate in planes substantially normal to the surface being shaved.

15. A dry shaving implement having cooperating shearing members, one presenting a flat skin-engaging face of substantial area traversed by long hair passages which are narrower than the area of face interposed between them, both members meeting in a common plane which is substantially normal to said skin-engaging face, said hair passages providing shearing edges in one member and the other member having openings on the opposite side of said common plane to provide shearing edges for cooperation with the edges of the hair passages, the shearing edges being adapted to operate normal to said skin-engaging face.

FELIX J. LEWANDO.